US010678596B2

(12) United States Patent
Xie et al.

(10) Patent No.: US 10,678,596 B2
(45) Date of Patent: Jun. 9, 2020

(54) USER BEHAVIOR-BASED DYNAMIC RESOURCE CAPACITY ADJUSTMENT

(71) Applicant: Alibaba Group Holding Limited, George Town, Grand Cayman (KY)

(72) Inventors: Yu Xie, Hangzhou (CN); Xiaojie Feng, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 95 days.

(21) Appl. No.: 15/441,139

(22) Filed: Feb. 23, 2017

(65) Prior Publication Data
US 2017/0242731 A1 Aug. 24, 2017

(30) Foreign Application Priority Data
Feb. 24, 2016 (CN) .......................... 2016 1 0102217

(51) Int. Cl.
*G06F 9/50* (2006.01)
*H04L 12/911* (2013.01)
*G06F 21/31* (2013.01)
*H04W 72/12* (2009.01)

(52) U.S. Cl.
CPC .......... *G06F 9/5027* (2013.01); *G06F 9/5083* (2013.01); *H04L 47/823* (2013.01); *G06F 21/316* (2013.01); *G06F 2209/5019* (2013.01); *H04W 72/1257* (2013.01)

(58) Field of Classification Search
None
See application file for complete search history.

(56) References Cited

U.S. PATENT DOCUMENTS 6,421,733 B1 * 7/2002 Tso .................. G06F 17/30905
358/402
6,480,861 B1 11/2002 Kanevsky et al.
7,768,920 B2 8/2010 Goshen et al.
(Continued)

FOREIGN PATENT DOCUMENTS

CN 102681899 A 9/2012
CN 103685347 A 3/2014
(Continued)

OTHER PUBLICATIONS

Morariu, et al., "Smart Resource Allocations for Highly Adaptive Private Cloud Systems", retrieved on Mar. 4, 2017 at <ceai.srait.ro/index.php?journal=ceai&page=article&op=download&path%5B%5D=2214&path%5B%5D=1306>>, CEAI, vol. 16, No. 3, 2014, pp. 23-34.
(Continued)

*Primary Examiner* — Abu Zar Ghaffari
(74) *Attorney, Agent, or Firm* — Lee & Hayes, P.C.

(57) ABSTRACT

The present disclosure describes acquiring characteristic behavior data of a user in real time, and at a detection triggering moment, matching the characteristic behavior data with a behavior pattern baseline obtained through offline calculation, thus predicting a peak or a trough of resource use. In this way, a resource specification to be used by the user is dynamically adjusted in advance according to a behavior pattern of the user, to meet a resource use demand of the user, and avoid that the user is in shortage of resources in the peak time or wastes resources in the trough time, thus achieving better predictability.

20 Claims, 10 Drawing Sheets

(56) References Cited

U.S. PATENT DOCUMENTS

| | | | |
|---|---|---|---|
| 8,046,462 B2 | 10/2011 | Trappeniers et al. | |
| 8,055,267 B2* | 11/2011 | Cho | H04W 28/20 |
| | | | 370/315 |
| 8,081,814 B2* | 12/2011 | Matsushita | G06K 9/4604 |
| | | | 356/237.4 |
| 8,165,594 B2 | 4/2012 | Wang et al. | |
| 8,311,865 B2* | 11/2012 | Vogel | G06Q 10/06 |
| | | | 705/7.11 |
| 8,396,890 B2* | 3/2013 | Lim | G06F 21/604 |
| | | | 707/781 |
| 8,402,540 B2* | 3/2013 | Kapoor | G06F 9/505 |
| | | | 709/224 |
| 8,499,066 B1* | 7/2013 | Zhang | H04L 47/823 |
| | | | 709/223 |
| 8,533,726 B2 | 9/2013 | Nishihara et al. | |
| 8,549,173 B1* | 10/2013 | Wu | G06F 9/5016 |
| | | | 370/235.1 |
| 8,582,584 B2 | 11/2013 | Rieger et al. | |
| 8,655,307 B1* | 2/2014 | Walker | H04W 72/0493 |
| | | | 455/405 |
| 8,793,381 B2 | 7/2014 | Baughman et al. | |
| 8,832,249 B2 | 9/2014 | Kuo et al. | |
| 9,026,483 B1* | 5/2015 | Cohen | G06Q 10/06375 |
| | | | 706/46 |
| 9,473,799 B1* | 10/2016 | Mentz | H04L 9/3213 |
| 9,514,293 B1* | 12/2016 | Moritz | H04L 63/102 |
| 9,614,784 B1* | 4/2017 | Houston | H04L 47/822 |
| 9,955,352 B2* | 4/2018 | Mahaffey | G06F 21/88 |
| 2003/0061260 A1 | 3/2003 | Rajkumar | |
| 2004/0111308 A1* | 6/2004 | Yakov | G06Q 10/087 |
| | | | 705/28 |
| 2005/0262505 A1 | 11/2005 | Esfahany et al. | |
| 2007/0041432 A1* | 2/2007 | Reial | H04B 1/7113 |
| | | | 375/148 |
| 2008/0059474 A1* | 3/2008 | Lim | G06F 21/604 |
| 2008/0071721 A1* | 3/2008 | Wang | G06N 20/00 |
| | | | 706/48 |
| 2008/0072229 A1 | 3/2008 | Kirton et al. | |
| 2008/0081959 A1* | 4/2008 | Jung | G06Q 50/24 |
| | | | 600/300 |
| 2008/0172262 A1* | 7/2008 | An | G06Q 10/0637 |
| | | | 705/7.37 |
| 2009/0055835 A1* | 2/2009 | Zhu | H04L 41/0896 |
| | | | 718/105 |
| 2010/0088422 A1* | 4/2010 | Weiss | H04L 65/80 |
| | | | 709/229 |
| 2010/0115610 A1* | 5/2010 | Tredoux | G06F 21/316 |
| | | | 726/19 |
| 2010/0162259 A1* | 6/2010 | Koh | G06F 9/45558 |
| | | | 718/104 |
| 2011/0093413 A1* | 4/2011 | Calcaterra | G06F 11/3409 |
| | | | 706/11 |
| 2011/0131329 A1* | 6/2011 | Kaplinger | G06F 9/5083 |
| | | | 709/226 |
| 2012/0159367 A1* | 6/2012 | Calcaterra | G06F 9/5011 |
| | | | 715/771 |
| 2013/0218814 A1 | 8/2013 | Kang et al. | |
| 2014/0016575 A1* | 1/2014 | El Gamal | H04W 16/00 |
| | | | 370/329 |
| 2014/0059207 A1* | 2/2014 | Gulati | G06F 9/505 |
| | | | 709/224 |
| 2014/0379902 A1 | 12/2014 | Wan et al. | |
| 2015/0019301 A1* | 1/2015 | Jung | G06Q 10/06393 |
| | | | 705/7.39 |
| 2015/0135187 A1* | 5/2015 | Lee | G06F 11/3409 |
| | | | 718/104 |
| 2015/0363240 A1* | 12/2015 | Koizumi | G06F 9/5061 |
| | | | 718/1 |
| 2016/0063471 A1* | 3/2016 | Kobres | G06F 21/316 |
| | | | 705/18 |
| 2016/0224378 A1* | 8/2016 | Rousseau | G06F 9/5027 |
| 2016/0321115 A1* | 11/2016 | Thorpe | H04L 47/823 |
| 2017/0193501 A1* | 7/2017 | Cole | G06Q 20/401 |
| 2017/0289593 A1* | 10/2017 | Li | H04N 21/23106 |
| 2019/0147465 A1* | 5/2019 | Okamoto | H02J 13/00 |
| | | | 705/7.31 |
| 2019/0213694 A1* | 7/2019 | Lee | G06Q 30/0202 |

FOREIGN PATENT DOCUMENTS

| | | |
|---|---|---|
| CN | 103873528 A | 6/2014 |
| CN | 104216786 A | 12/2014 |

OTHER PUBLICATIONS

PCT Search Report and Written Opinion dated May 8, 2017 for PCT Application No. PCT/US17/19192, 12 pages.

Wei, et al., "A game-theoretic method of fair resource allocation for cloud computing services", retrieved on Mar. 4, 2017 at 140.123. 102.14:8080/reportSys/file/paper/sktsung/cktsund_39_paper. pdf>>, The Journal of Supercomputing, vol. 54, Issue 2, Springer, 2010, pp. 252-269.

Machine translation (English) of the First Chinese Office Action dated Aug. 2, 2019 for Chinese Patent Application No. 201710104236. 3, a counterpart foreign application of U.S. Appl. No. 15/441,139, 13 pages.

Machine translation (English) First Chinese Search Report dated Jul. 22, 2019 for Chinese Patent Application No. 2017101042363, 2 pages.

* cited by examiner

USER BEHAVIOR-BASED DYNAMIC RESOURCE CAPACITY ADJUSTMENT

CROSS REFERENCE TO RELATED PATENT APPLICATIONS

This application claims priority to Chinese Patent Application No. 201610102217.2, filed on Feb. 24, 2016, entitled "Method and Device for User Behavior-Based Dynamic Resource Adjustment," which is hereby incorporated by reference in its entirety.

TECHNICAL FIELD

The present disclosure relates to the field of computers, and, in particular, to a user behavior-based dynamic resource adjustment method and apparatus.

BACKGROUND

In the cloud industry, a user often purchases a desired resource specification, including a storage space, a virtual machine, a computing capability, and the like, according to his/her own requirements and the requirements of a business scenario. At present, in a cloud industry market, a specification of a cloud product resource is fixed in purchase. Later, the user increases or reduces the resource specification according to his/her own needs, and a back-end technician updates a resource specification of a cloud product service thereof according to the capacity expansion or reduction of demand submitted by the user.

Usually, cloud product service resources used by the user do not exceed the purchased resource specification; service resources can be fully used or, during special periods, even an upper limit of the specification may be exceeded. In addition, most users do not know their own service use conditions, and may put forward a capacity expansion or reduction demand only when the service resources are used up or services have not been in use for a long time.

In the conventional techniques, an online dynamic capacity expansion method is used, in which, through real-time acquisition of a system load state and an application running condition, an artificial neural network is used as a mechanism that determines resource expansion and reduction trigger, and virtual computing resources are dynamically expanded without interrupting a service. However, the solution focuses on a real-time load condition of the resource per se, and the resource specification is expanded in real time in the peak of resource use, which lacks predictability.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide a user behavior-based dynamic resource adjustment method and apparatus, to solve the problem in the conventional techniques that the resource specification can be adjusted only according to a real-time load condition, which lacks predictability.

To achieve the foregoing objective, the present disclosure provides a user behavior-based dynamic resource adjustment method, the method including:
  acquiring characteristic behavior data of a user;
  detecting, at a detection triggering moment, whether characteristic behavior data of the user in a first time period matches a behavior pattern baseline, wherein the first time period is a time period of preset duration before the detection triggering moment; and
  if the characteristic behavior data of the user in the first time period matches the behavior pattern baseline, changing a resource specification of the user according to a resource demand baseline corresponding to the behavior pattern baseline.

The detecting whether the characteristic behavior data of the user in a first time period matches a behavior pattern baseline includes:
  acquiring behavior aggregate values of the user in the first time period according to the characteristic behavior data of the user in the first time period and preset weights; and
  determining that the characteristic behavior data of the user in the first time period matches the behavior pattern baseline in response to determining that the behavior aggregate values of the user in the first time period are within a confidence interval of the behavior pattern baseline.

The method may further comprise:
  generating the behavior pattern baseline of the user; and
  generating the resource demand baseline according to the behavior pattern baseline.

The generating the behavior pattern baseline of the user may include:
  acquiring characteristic behavior data of the user in a second time period, the second time period being a time period for collecting characteristic behavior data samples that generate the behavior pattern baseline;
  acquiring a behavior aggregate value of each moment in the second time period according to the characteristic behavior data of the user in the second time period and a preset weight;
  determining, according to the behavior aggregate value of each moment in the second time period, whether behavior aggregate values of the user in the second time period are periodic; and
  determining the behavior pattern baseline according to the behavior aggregate values of the user in the second time period in response to determining that the behavior aggregate values of the user in the second time period are periodic.

The determining, according to the behavior aggregate value of each moment in the second time period, whether behavior aggregate values of the user in the second time period are periodic may include:
  matching the behavior aggregate values of the user in the second time period with preset cycle types in ascending order of time granularities of the preset cycle types; and
  determining that the behavior aggregate values of the user in the second time period are periodic in response to determining that the behavior aggregate values of the user in the second time period match at least a respective preset cycle type.

The matching the behavior aggregate values of the user in the second time period with preset cycle types may include:
  dividing the behavior aggregate values of the user in the second time period into multiple cycles according to the respective preset cycle type; and determining that the behavior aggregate values of the user in the second time period match the respective preset cycle type in response to determining that a correlation coefficient of a fitted line of behavior aggregate values in the multiple cycles exceeds a threshold.

The determining the behavior pattern baseline according to the behavior aggregate values of the user in the second time period may include:

selecting, from the behavior aggregate values in the second time period, behavior aggregate values of several cycles;

acquiring behavior correction values of each moment in the several cycles according to behavior aggregate values of sliding windows under forgetting mechanism of each moment in the several cycles;

acquiring a mean value of the behavior correction values of each moment in the several cycles as an aggregate correction value of the user at each moment in the several cycles;

acquiring a confidence interval of the aggregate correction values of each moment in the several cycles; and determining the behavior pattern baseline of the user according to the confidence interval of the aggregate correction values of each moment in the several cycles.

The acquiring the confidence interval of the aggregate correction values of each moment in the cycles may include:

acquiring a mean value and a variance of the behavior correction values of each moment in the several cycles;

using a sum of the mean value and the variance as an upper limit value of the confidence interval; and using a difference between the mean value and the variance as a lower limit value of the confidence interval.

Based on another aspect of the present disclosure, a user behavior-based dynamic resource adjustment apparatus is further provided, the device including:

a user behavior monitoring device that acquires characteristic behavior data of a user;

a detection device that detects, at a detection triggering moment, whether characteristic behavior data of the user in a first time period matches a behavior pattern baseline, wherein the first time period is a time period of preset duration before the detection triggering moment; and a changing device that changes a resource specification of the user according to a resource demand baseline corresponding to the behavior pattern baseline when the characteristic behavior data of the user in the first time period matches the behavior pattern baseline.

For example, the detection device detects, at the detection triggering moment, behavior aggregate values of the user in the first time period according to the characteristic behavior data of the user in the first time period and preset weights, and determine that the characteristic behavior data of the user in the first time period matches the behavior pattern baseline in response to determining that the behavior aggregate values of the user in the first time period are within a confidence interval of the behavior pattern baseline.

The apparatus may further comprise an offline calculation device that generates a behavior pattern baseline of the user, and generates a corresponding resource demand baseline according to the behavior pattern baseline.

For example, the offline calculation device may include:

an offline acquisition module that acquires characteristic behavior data of the user in a second time period, the second time period being a time period for collecting characteristic behavior data samples that generate the behavior pattern baseline;

a behavior statistics module that acquires a behavior aggregate value of each moment in the second time period according to the characteristic behavior data and a preset weight;

a cycle matching module that determines, according to the behavior aggregate value of each moment in the second time period, whether behavior aggregate values of the user in the second time period are periodic; and a behavior pattern analysis module that determines the behavior pattern baseline according to the behavior aggregate values of the user in the second time period when the behavior aggregate values of the user in the second time period are periodic.

For example, the cycle matching module may match the behavior aggregate values of the user in the second time period with preset cycle types in ascending order of time granularities of the preset cycle types, and determines that the behavior aggregate values of the user in the second time period are periodic in response to determining that the behavior aggregate values of the user in the second time period match at least a respective preset cycle type.

For example, the cycle matching module may, when matching the behavior aggregate values of the user in the second time period with preset cycle types, divide the behavior aggregate values of the user in the second time period into multiple cycles according to the respective preset cycle type, and determine that the behavior aggregate values of the user in the second time period match the respective preset cycle type in response to determining that a correlation coefficient of a fitted line of behavior aggregate values in the multiple cycles exceeds a threshold.

For example, the behavior pattern analysis module may:

select, from the behavior aggregate values in the second time period, behavior aggregate values of several cycles in response to determining that the behavior aggregate values of the user in the second time period are periodic;

acquire behavior correction values of each moment in the several cycles according to behavior aggregate values of sliding windows under forgetting mechanism of each moment in the several cycles;

acquire a mean value of the behavior correction values of each moment in the several cycles as an aggregate correction value of the user at each moment in the cycles;

acquire a confidence interval of the aggregate correction values of each moment in the several cycles, and determine the behavior pattern baseline of the user according to the confidence interval.

For example, the behavior pattern analysis module may:

when acquiring the confidence interval of the aggregate correction values of each moment in the several cycles, acquire a mean value and a variance of the behavior correction values of each moment in the several cycles;

use the sum of the mean value and the variance as an upper limit value of the confidence interval; and use a difference between the mean value and the variance as a lower limit value of the confidence interval.

Based on another aspect of the present disclosure, one or more memories stored thereon computer-executable instructions that, when executed by one or more processors, cause the processor to perform acts comprising:

acquiring characteristic behavior data of a user;

detecting, at a detection triggering moment, whether characteristic behavior data of the user in a first time period matches a behavior pattern baseline, the first time period being a time period of preset duration before the detection triggering moment; and changing a resource specification of the user according to a resource demand baseline corresponding to the behavior pattern baseline in response to determining that the characteristic behavior data of the user in the first time period matches the behavior pattern baseline.

For example, the detecting whether characteristic behavior data of the user in a first time period matches a behavior pattern baseline may include:

acquiring behavior aggregate values of the user in the first time period according to the characteristic behavior data of the user in the first time period and preset weights; and determining that the characteristic behavior data of the user in the first time period matches the behavior pattern baseline in response to determining that the behavior aggregate values of the user in the first time period are within a confidence interval of the behavior pattern baseline.

The acts may further comprise:

generating the behavior pattern baseline of the user; and generating the resource demand baseline according to the behavior pattern baseline.

For example, the generating the behavior pattern baseline of the user may include:

acquiring characteristic behavior data of the user in a second time period, the second time period being a time period for collecting characteristic behavior data samples that generate the behavior pattern baseline;

acquiring a behavior aggregate value of each moment in the second time period according to the characteristic behavior data of the user in the second time period and a preset weight;

determining, according to the behavior aggregate value of each moment in the second time period, whether behavior aggregate values of the user in the second time period are periodic; and determining the behavior pattern baseline according to the behavior aggregate values of the user in the second time period in response to determining that the behavior aggregate values of the user in the second time period are periodic.

More acts performed by the one or more processors may be referenced to the method and apparatus embodiments.

Compared with the conventional techniques, the technical solution of the present disclosure acquires characteristic behavior data of a user in real time, and at a detection triggering moment, matches the characteristic behavior data with a behavior pattern baseline obtained through offline calculation, thus predicting a peak or a trough of resource use. In this way, a resource specification to be used by the user is dynamically adjusted in advance according to a behavior pattern of the user, to meet a resource use demand of the user and avoid that the user is in shortage of resources in the peak time or waste resources in the trough time, thus achieving better predictability.

BRIEF DESCRIPTION OF THE DRAWINGS

The features, objectives, and advantages of the present disclosure will become more evident based on the detailed description of non-limiting example embodiments by reference to the following accompanying drawings.

Identical or similar reference signs in the accompanying drawings represent identical or similar components.

DETAILED DESCRIPTION

The present disclosure is further described below in detail with reference to the accompanying drawings.

In a typical configuration of the present disclosure, a terminal, a service network device, and a trusted party all include one or more central processing units (CPUs) or processors, input/output interfaces, network interfaces, and memories.

The memory may include a volatile memory, a random access memory (RAM) and/or a non-volatile memory or the like in computer readable media, for example, a read-only memory (ROM) or a flash RAM. The memory is an example of computer readable media.

The computer readable media includes non-volatile and volatile media as well as movable and non-movable media, and can implement information storage by means of any method or technology. Information may be a computer readable instruction, a data structure, a module of a program or other data. Examples of computer readable media include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission medium, and may be used to store information accessible to a computing device. According to the definition of this text, the computer readable medium does not include transitory media, such as a modulated data signal and a carrier.

Figure 1:
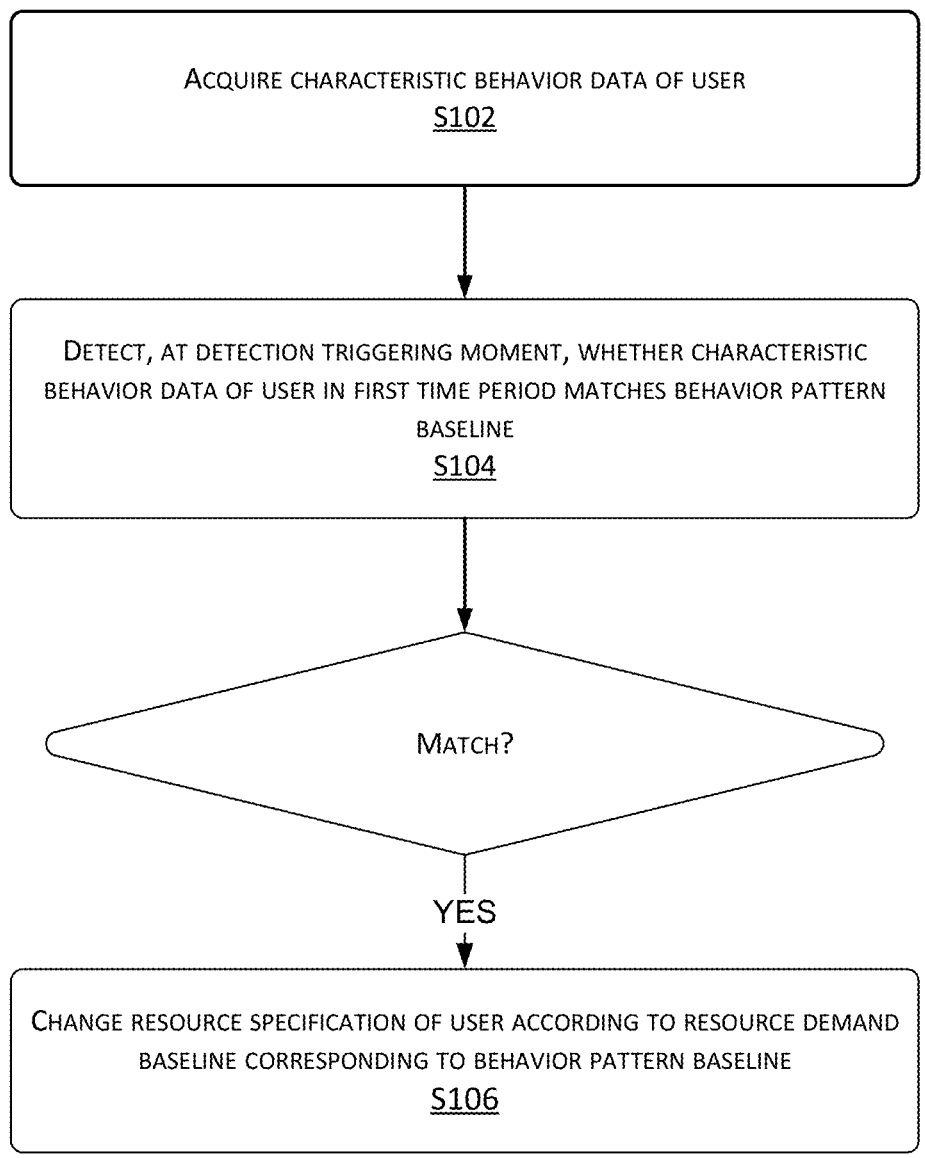
FIG. 1 is a flow chart of a user behavior-based dynamic resource adjustment method according to an example embodiment of the present disclosure.

FIG. 1 is a flow chart of an example user behavior-based dynamic resource adjustment method, which may include the following steps:

Step S102: Acquire characteristic behavior data of a user.

Herein, the characteristic behavior data refers to behavior data that effectively represent resource use of a user. By taking use of resources of a cloud product service as an example, a CPU utilization rate, a memory utilization rate, a disk utilization rate, Query Per Second (QPS), the number of active connections, access delay and the like may be used as the characteristic behavior data. When the characteristic behavior data is acquired, behavior data of the user is collected as much as possible, and then effective data is extracted as the characteristic behavior data. For example, all behavior data of the user may be acquired in real time by means of real-time monitoring, and then characteristic behavior data is extracted from all online behavior data of the user and buffered, for use in subsequent processing.

In an actual application, the type of the characteristic behavior data is kept relatively stable in a period of time, but may change over time. For example, in the first quarter, a behavior characteristic index of the user may include access delay, but in the second quarter, with upgrade of a network condition, it is possible that the data may no longer effectively represent resource use of the user, and the access delay may be canceled from the characteristic behavior data.

Step S104: Detect, at a detection triggering moment, whether characteristic behavior data of the user in a first time period matches a behavior pattern baseline.

Herein, the detection triggering moment refers to a moment for matching current characteristic behavior data of the user with a behavior pattern baseline, and may be generally set as a moment when a user behavior changes significantly and it is necessary to change a resource specification to adapt to the changed user behavior. For example, about 8:00 every day is a peak in usage of a cloud product; at this point, the characteristic behavior data such as a CPU utilization rate and a memory utilization rate may increase evidently, which may cause existing resources to be insufficient. Therefore, 8:00 may be set as the detection triggering moment.

Further, an advance may be pre-defined, such that the time for detection and changing the specification is a little earlier than an actual resource demand change. Still by taking the foregoing scenario as an example, an advance of 10 minutes may be set, and the detection triggering moment is set as 7:50.

The first time period is a time period of preset duration before the detection triggering moment, and during actual detection, the characteristic behavior data in the first time period is used as sample data for matching processing. The duration specifically set for the first time period may be determined according to an actual demand; for example, in this example embodiment, it may be set as 15 minutes; that is, characteristic behavior data between 7:35 and 7:50 is used as a sample to be matched with a behavior pattern baseline.

The behavior pattern baseline may be obtained through offline calculation using characteristic behavior data accumulated in a period of time as a sample, and is used to indicate a use trend of the user with regard to a cloud product service resource in a certain cycle. By matching the characteristic behavior data obtained in real time with the behavior pattern baseline, it is determined whether a current behavior of the user is in line with a predicted use trend, thereby achieving prediction on a resource use behavior of the user.

For example, in this example embodiment, when it is detected whether characteristic behavior data of the user in a first time period matches a behavior pattern baseline, behavior aggregate values of the user in the first time period are acquired at first according to the characteristic behavior data of the user in the first time period and preset weights, and if the behavior aggregate values of the user in the first time period are within a confidence interval of the behavior pattern baseline, it is determined that the characteristic behavior data of the user in the first time period matches the behavior pattern baseline.

For each type of characteristic behavior data, setting of a weight thereof mainly takes into account a degree of impact of the type of characteristic behavior data on the resource use behavior of the user. For example, for several types of characteristic behavior data mentioned in the above example, weights corresponding thereto may be set as follows: the CPU utilization rate (weight: 15%), the memory utilization rate (weight: 20%), the disk utilization rate (weight: 10%), the QPS (weight: 40%), the number of active connections (weight: 10%), and the access delay (weight: 5%).

Figure 2A:
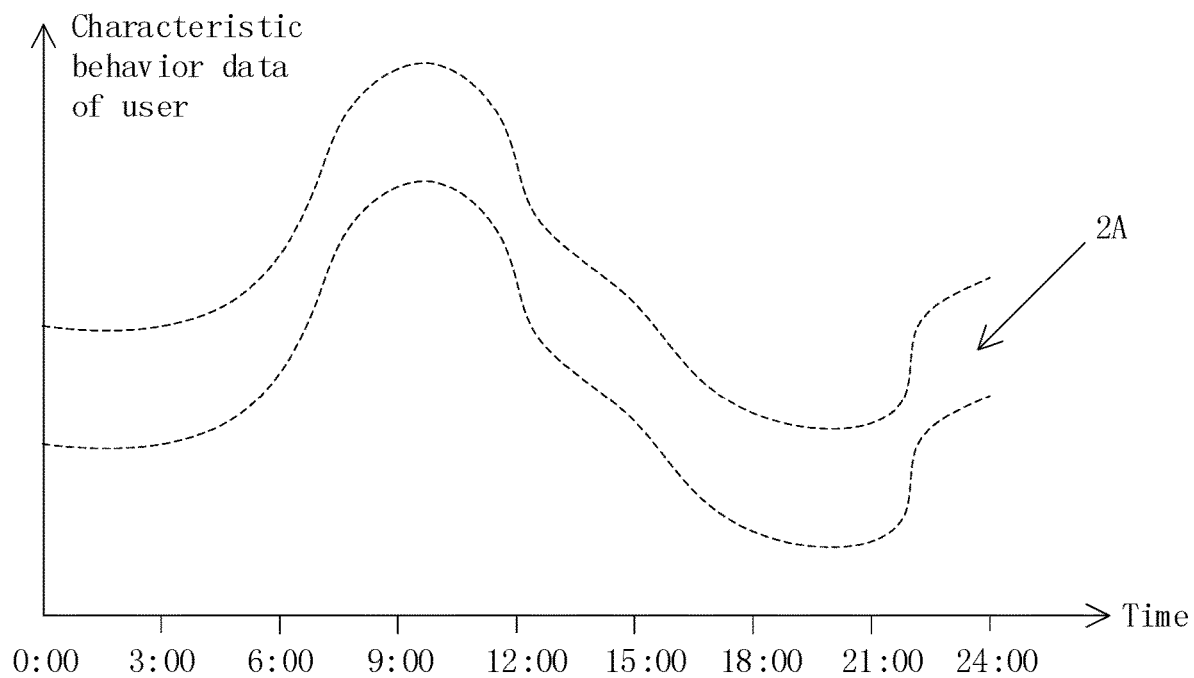
FIG. 2(a) is a schematic diagram of a behavior pattern baseline of a user according to an example embodiment of the present disclosure.
Figure 2B:
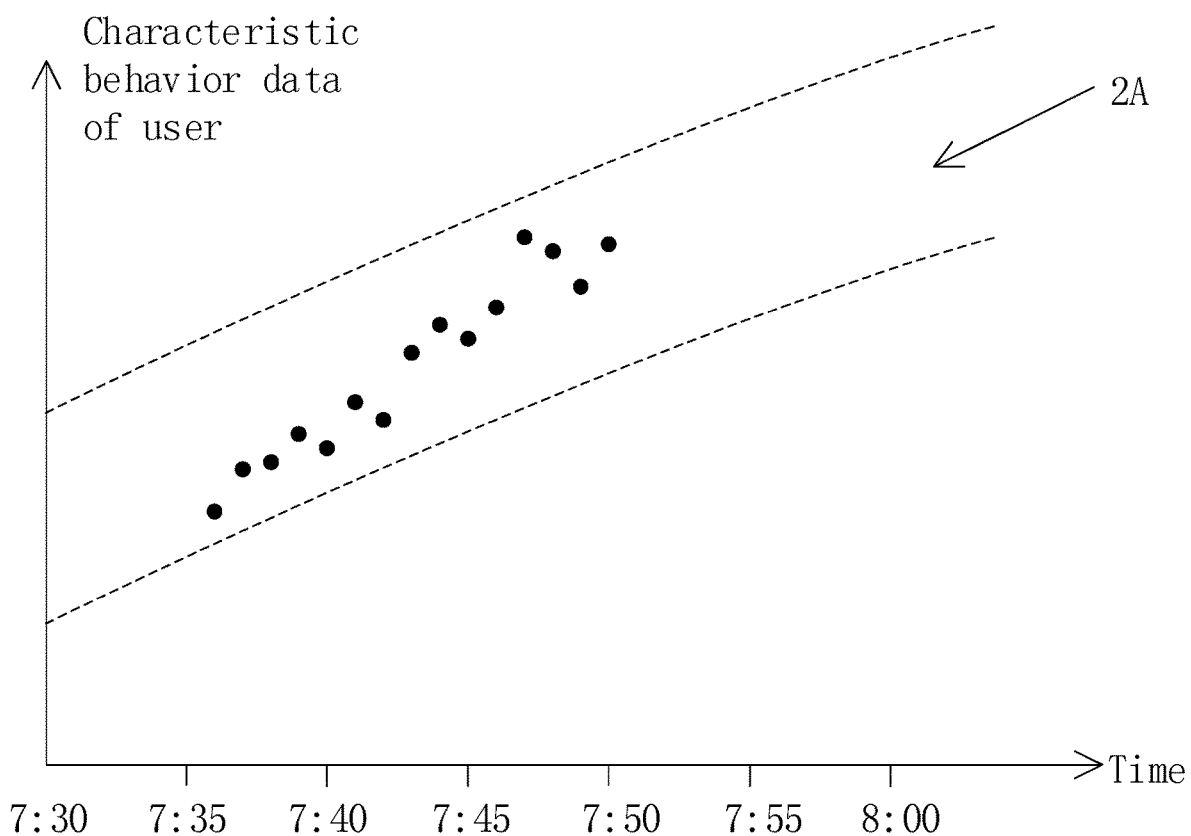
FIG. 2(b) is a schematic diagram of distribution of behavior aggregate values of a user in a first time period according to an example embodiment of the present disclosure.

By setting a confidence interval for the behavior pattern baseline, it is determined that the characteristic behavior data matches the behavior pattern baseline as long as behavior aggregate values of the user in the first time period are in the confidence interval of the behavior pattern baseline. FIG. 2(a) is a schematic diagram of an example behavior pattern baseline of a user, and the part shown by 2A in the figure is a confidence interval; still by taking the above scenario as an example, in which the first time period is 15 minutes, assuming that a statistical granularity of the characteristic behavior data is set as "per minute", 15 corresponding behavior aggregate values is obtained through calculation accordingly, and a distribution thereof is as shown in FIG. 2(b), and they are all in the confidence interval of the behavior pattern baseline. In order to improve the rationality of the matching result, a significance level $\alpha$ may be pre-defined, and as long as a ratio of behavior aggregate values not in the confidence interval of the behavior pattern baseline to all the behavior aggregate values is lower than $\alpha$, it may still be determined that the characteristic behavior data of the user in the first time period matches the behavior pattern baseline.

Step S106. If the characteristic behavior data of the user in the first time period matches the behavior pattern baseline, a resource specification of the user is changed according to a resource demand baseline corresponding to the behavior pattern baseline.

Figure 2C:
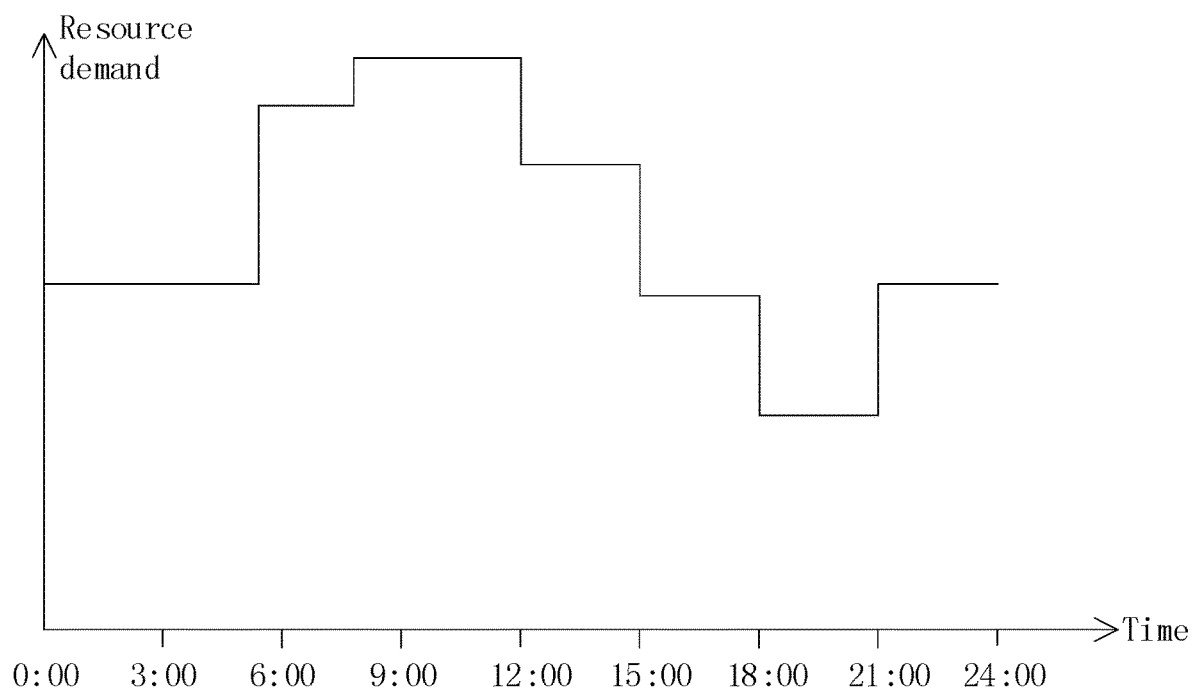
FIG. 2(c) is a schematic diagram of a resource demand baseline corresponding to a behavior pattern baseline of a user according to an example embodiment of the present disclosure.

The resource demand baseline is used to indicate a resource specification to be assigned to the user at a particular moment, for example, more resources need to be assigned in a peak, while fewer resources need to be assigned in a trough, thus achieving reasonable resource assignment. By taking a certain cloud product as an example, corresponding resources thereof may include, but not limited to, a storage space, a memory, the number of server instances, and so on. For each user, resource demand baselines thereof are one-to-one corresponding to behavior pattern baselines thereof. In an optimal condition, the resource demand baseline can ensure that the user is able to obtain a most reasonable resource specification at any moment in a behavior cycle when in line with the behavior pattern baseline. In an actual application, as excessively frequent changes of resource specification may affect normal business processing, the resource specification of the user may be changed only when the resource use behavior of the user changes significantly (generally at a preset detection triggering moment). Thus, the resource demand baseline is generally in the form of a broken line, as shown by FIG. 2(c).

By taking a memory resource as an example, the user requires a memory of 1000 MB in a peak but only requires 600 MB before the peak, and if it is determined, at a detection triggering moment corresponding to the peak, that a behavior of the user matches the behavior pattern baseline, the resource specification of the user may be changed to a memory of 1000 MB, to meet the user's resource use demand in the peak.

In addition, if the result of the matching detection is that the characteristic behavior data of the user in the first time period does not match the behavior pattern baseline, it indicates that the current resource use behavior of the user is not in line with a regular user behavior trend of the user in the cycle, and at this point, the resource specification is not changed, and matching detection is not performed again until a next detection triggering moment.

The technical solution of the present disclosure acquires characteristic behavior data of a user in real time, and at a detection triggering moment, matches the characteristic behavior data with a behavior pattern baseline obtained through offline calculation, thereby predicting a peak or a trough of resource use. In this way, a resource specification to be used by the user is dynamically adjusted in advance according to a behavior pattern of the user, to meet a resource use demand of the user, and avoid that the user is in shortage of resources in the peak time or wastes resources in the trough time, thereby achieving better predictability.

The foregoing method is mainly applied to online real-time processing, to achieve dynamic adjustment on a resource specification. In order to ensure that the online real-time processing part is executed accurately, the method further includes an offline processing part, to obtain a behavior pattern baseline and a resource demand baseline for matching and changing. Therefore, an example embodiment of the present disclosure further provides a user behavior-based dynamic resource adjustment method, which, on the basis of the foregoing method, further includes generating a behavior pattern baseline of the user, and generating a corresponding resource demand baseline according to the behavior pattern baseline.

Figure 3:
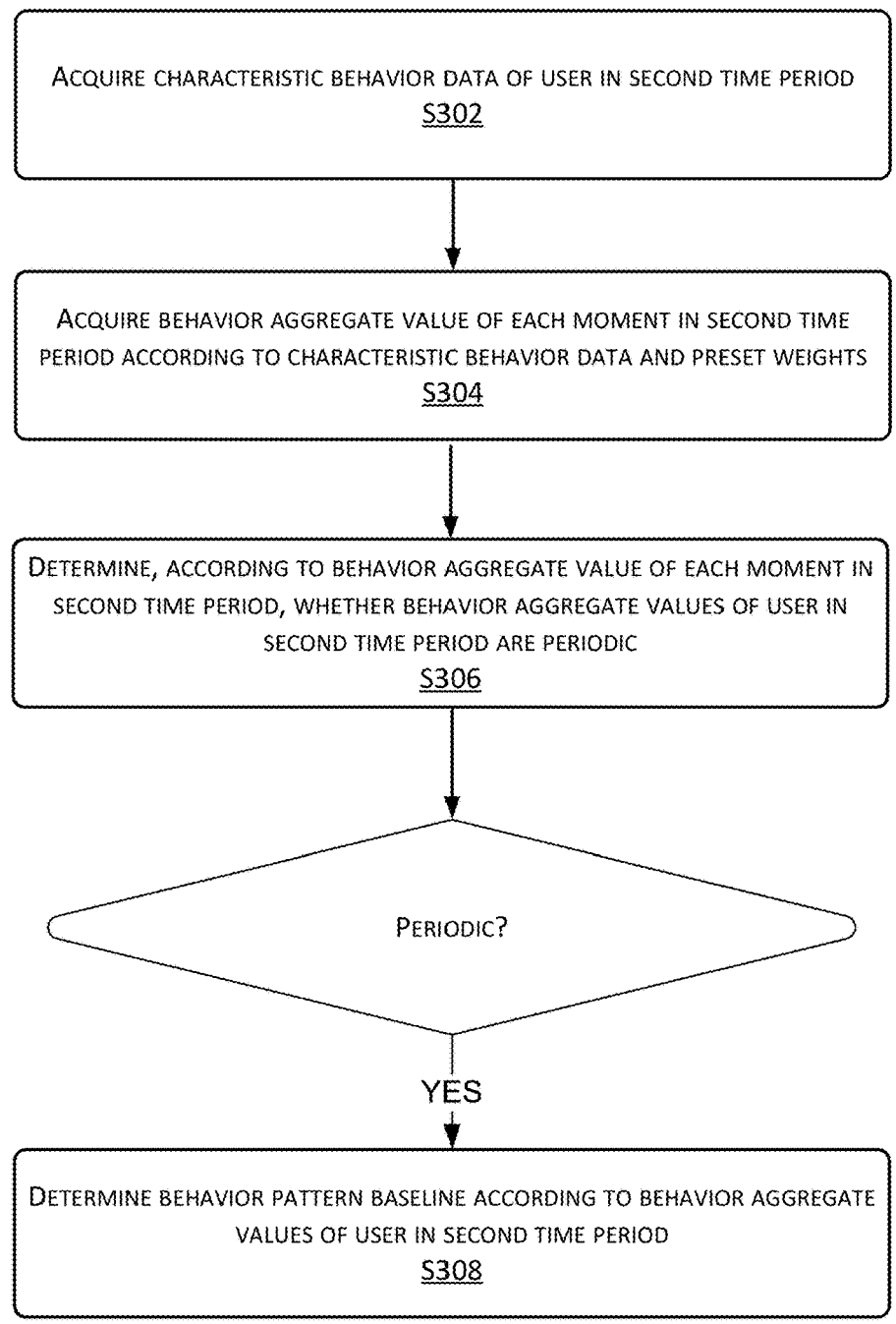
FIG. 3 is a flow chart of a method for generating a behavior pattern baseline of a user according to an example embodiment of the present disclosure.

An example method of generating a behavior pattern baseline of the user includes several steps shown in FIG. 3:

Step S302. Acquire characteristic behavior data of the user in a second time period.

The second time period is a time period for collecting characteristic behavior data samples that generate the behavior pattern baseline. In an actual application, as a cycle type of a behavior pattern may be preliminarily determined according to actual experience, the duration of N cycles is used as the second time period. For example, if a behavior pattern of a user is based on a daily cycle, characteristic behavior data of the user in recent ten days may be acquired as a basis for generating a behavior pattern baseline. Certainly, in a situation where a preliminary judgment cannot be made according to actual experience, a longer time period may also be set as the second time period, to ensure that an accurate behavior pattern baseline can be obtained.

Similar to the online real-time processing part, when the characteristic behavior data of the user is acquired, behavior data of the user may also be collected as much as possible, and then effective data is extracted as the characteristic behavior data.

Step S304. Acquire a behavior aggregate value of each moment in the second time period according to the characteristic behavior data and preset weights. For example, the behavior aggregate value of each moment may be calculated according to the following formula:

$$B_t = \sum_{i=1}^{n} A_i \times P_i$$

Wherein, $B_t$ indicates a behavior aggregate value of a moment t, $A_i$ indicates characteristic behavior data of the moment t, and $P_i$ indicates a weight corresponding to $A_i$.

Step S306. Determine, according to the behavior aggregate value of each moment in the second time period, whether behavior aggregate values of the user in the second time period are periodic. As the behavior aggregate value of each moment in the second time period is obtained in step S304, aggregate data of time-behavior aggregate values is obtained. During cycle type matching, the aggregate data of time-behavior aggregate values may be matched with a preset set of several common cycle types, thus determining whether the behavior aggregate values are periodic and a specific cycle type.

In this example embodiment, in order to acquire the most precise cycle type, the behavior aggregate values of the user in the second time period may be matched with preset cycle types in ascending order of time granularities of the cycle types, and it is determined that the behavior aggregate values of the user in the second time period are periodic if they match any cycle type. For example, matching is sequentially performed in order of hourly, daily, and weekly, and when the aggregate data of time-behavior aggregate values can match a daily cycle type, it is unnecessary to continue matching with a weekly cycle type; it is determined that the behavior aggregate values of the user in the second time period are periodic, and the cycle type is "daily".

For example, during cycle type matching, the behavior aggregate values of the user in the second time period are firstly divided into multiple cycles according to a preset cycle type, and it is determined that the behavior aggregate values of the user in the second time period match the cycle type if a correlation coefficient of a fitted line of the behavior aggregate values in the multiple cycles exceeds a threshold.

In this example embodiment, assuming that the second time period is recent ten days, if matching is performed according to an hourly cycle type at first, behavior aggregate values in the ten days are divided on an hourly basis, and if a correlation coefficient of a fitted line of the behavior aggregate values in the multiple cycles is relatively low and does not exceed a preset threshold, it is determined that the behavior aggregate values of the user in the second time period do not match the hourly cycle type. Then, matching is continued according to a daily cycle type, and the behavior aggregate values in the ten days are divided on a daily basis; thus, the behavior aggregate values are divided into ten groups of behavior aggregate value data as sample data for calculation. If a calculated correlation coefficient of a fitted line of the ten groups of behavior aggregate value data exceeds the threshold, it is determined that the behavior aggregate values of the user in the second time period match the hourly cycle type.

In an actual application, the correlation coefficient may be a Pearson correlation coefficient, and the correlation coefficient is a value between [−1, 1], wherein 1 indicates that two values in comparison are positively correlated with each other, and −1 indicates that the two values are negatively correlated with each other, that is, when an absolute value of a similarity coefficient is closer to 1, it indicates that correlation between the two values is greater, otherwise, it indicates that the correlation between the two values is smaller. In this example embodiment, generally, when the correlation coefficient is greater than 0.75, it may be considered that the correlation between the two values meets the requirement and the two values have similarity. For ten groups of sample data, according to a precision requirement, any number of combinations may be selected to determine the correlation. For example, four groups or five groups therein are extracted for pairwise calculation, and it is determined, according to calculated comparison results between multiple correlation coefficients and the threshold, whether the sample data matches the cycle type.

During determination of the correlation between any two groups of sample data, it is feasible to first generate a fitted line according to each group of sample data and then calculate a Pearson correlation coefficient between the fitted lines, thus making a determination. In addition, it is also feasible to generate a slope of each moment according to each group of sample data and then calculate their correlation according to slopes of corresponding moments.

In addition, if the behavior aggregate values of the user in the second time period do not match any cycle type after all preset cycle types are traversed, it is considered that the behavior aggregate values are not periodic. In the situation where the behavior aggregate values are not periodic, an empty behavior pattern baseline may be generated directly, and a corresponding resource demand baseline is not generated.

Step S308. If the behavior aggregate values of the user in the second time period are periodic, a behavior pattern baseline is determined according to the behavior aggregate values of the user in the second time period.

Figure 4:
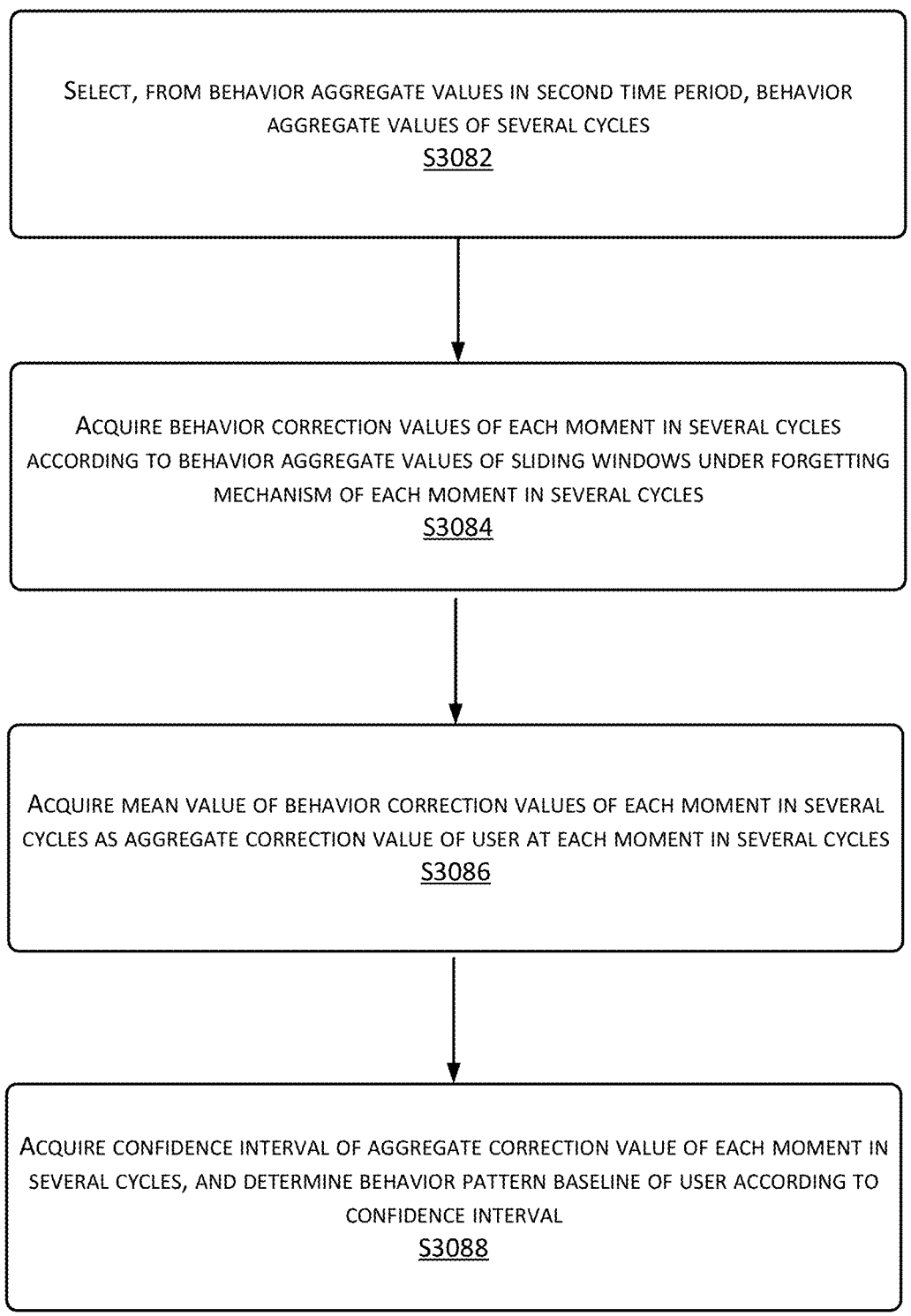
FIG. 4 is a processing flow chart of determining a behavior pattern baseline according to an example embodiment of the present disclosure.

For example, a processing flow of determining a behavior pattern baseline is as shown in FIG. 4, which includes the following steps:

Step S3082. Select, from the behavior aggregate values in the second time period, behavior aggregate values of several cycles. In a situation where a cycle type has been determined, behavior aggregate value data of several cycles is selected from all cycles in the second time period, for use in subsequent processing. In this process, the specific number of selected cycles may be selected arbitrarily according to a requirement on calculation precision. For example, in this example embodiment, the second time period includes ten days in total (i.e., 10 cycles), and at this point, behavior aggregate values of any 5 days therein can be selected, for use in subsequent processing.

Step S3084. Acquire behavior correction values of each moment in the several cycles according to behavior aggregate values of sliding windows under forgetting mechanism of each moment in the several cycles. Wherein, the sliding window under forgetting mechanism may be set to have a different window length according to factors such as a cycle type and a statistical granularity of behavior aggregate values. For example, in this example embodiment, the cycle type is "daily" and the statistical granularity of behavior aggregate values is "per minute", and thus the sliding window under forgetting mechanism may be set as 10 minutes. That is, by taking the moment 8:00 as an example, a behavior correction value of 8:00 is calculated according to all behavior aggregate values between 7:55 and 8:05. When the behavior correction value is calculated, weights of behavior aggregate values of other moments in the sliding window under forgetting mechanism can be determined according to distances to a reference moment (8:00). For example, the closer the moment is to the reference moment, the greater the weight thereof is, and in this embodiment, weights of behavior aggregate values of various moments in the sliding window under forgetting mechanism are as shown in the following table:

| Moment | 7:55 | 7:56 | 7:57 | 7:58 | 7:59 | 8:00 | 8:01 | 8:02 | 8:03 | 8:04 | 8:05 |
|---|---|---|---|---|---|---|---|---|---|---|---|
| Weight | 3% | 5% | 7% | 10% | 15% | 40% | 15% | 10% | 7% | 5% | 3% |

Thus, a behavior correction value of a certain moment in all the selected cycles can be calculated according to the following formula:

$$C_t = \sum_{j=1}^{n} B_j \times P_j$$

$C_t$ indicates a behavior correction value of a moment t, $B_j$ indicates a behavior aggregate value of each moment in the sliding window under forgetting mechanism of the moment t, and $P_j$ indicates a weight corresponding to $B_j$.

Step S3086. Acquire a mean value of the behavior correction values of each moment in the several cycles as an aggregate correction value of the user at each moment in the several cycles. In this example embodiment, as the number of the cycles selected is 5, for a certain moment, 5 behavior correction values corresponding to respective cycles may be calculated respectively according to the foregoing formula, and an arithmetic mean thereof is an aggregate correction value of the user at this moment in the cycles; by traversing all moments in the cycles, an aggregate correction value of the user at each moment in the cycles can be obtained. A curve formed by the aggregate correction values is a behavior pattern baseline.

Step S3088. Acquire a confidence interval of the aggregate correction value of each moment in the several cycles, and determine the behavior pattern baseline of the user according to the confidence interval. In an actual application, the confidence interval thereof may be determined in the following manner: acquiring a mean value $\overline{X}$ and a variance $D(X)$ of the behavior correction values of each moment in the several cycles, using the sum of the mean value and the variance as an upper limit value of the confidence interval, and using a difference between the mean value and the variance as a lower limit value of the confidence interval, that is, $$\text{confidence interval} = [\overline{X} - D(X), \overline{X} + D(X)]$$

Thus, the behavior pattern baseline as shown in FIG. 2(a) is obtained. For the confidence interval, a significance level α may be further defined, such that a more reasonable result may be obtained when user behavior matching is performed according to the behavior pattern baseline.

After the behavior pattern baseline is acquired, a time-varying resource demand baseline of the user is obtained according to a mapping relationship between resource specifications and behavior patterns. As excessively frequent changes of resource specification may affect normal business processing, the resource specification of the user will be changed only when a resource use behavior of the user changes significantly. Thus, the resource demand baseline is generally in the form of a broken line, as shown in FIG. 2(c).

Figure 5:
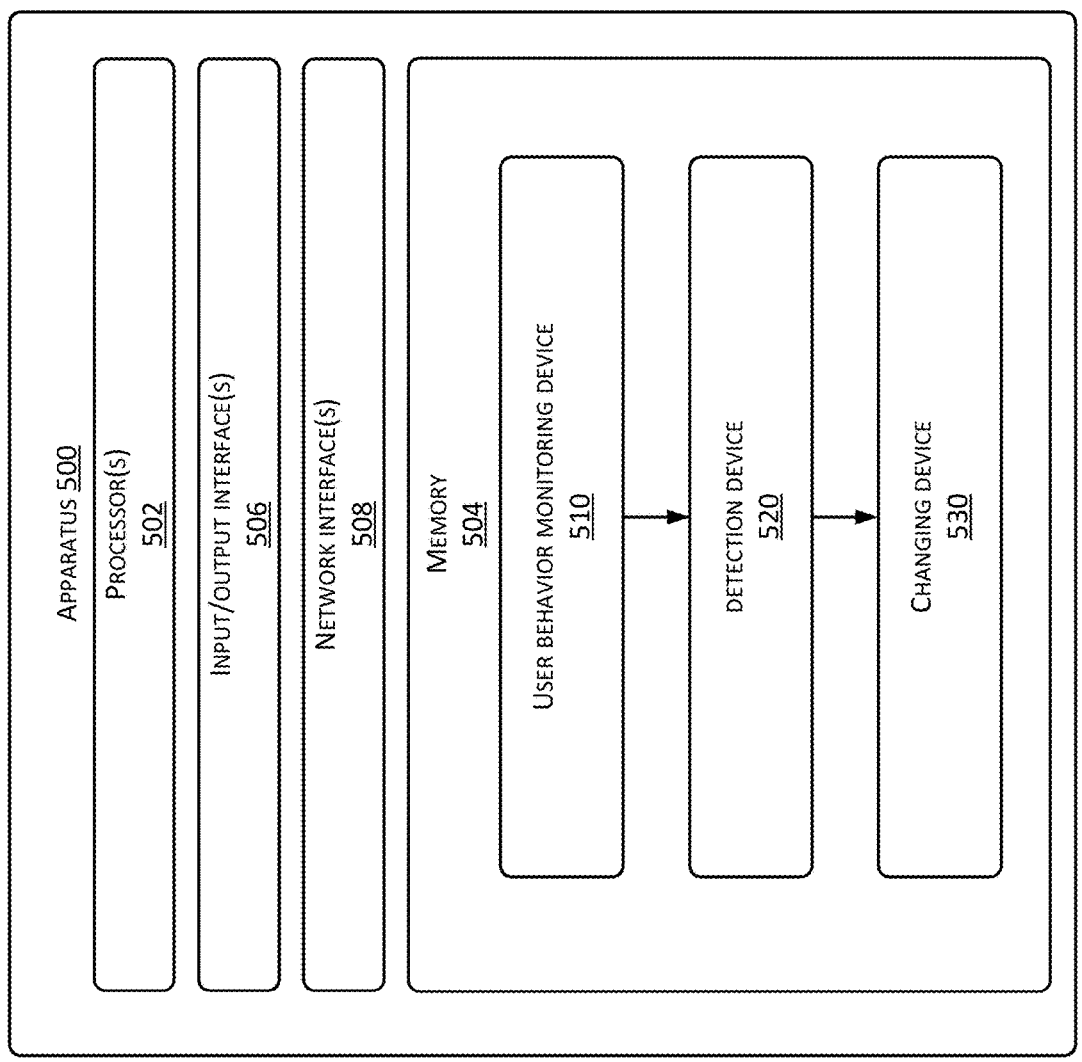
FIG. 5 is a schematic structural diagram of a user behavior-based dynamic resource adjustment apparatus according to an example embodiment of the present disclosure.

Based on another aspect of the present disclosure, a user behavior-based dynamic resource adjustment apparatus 500 is further provided, and the structure of the apparatus is as shown in FIG. 5, including one or more processor(s) 502 or data processing unit(s) and memory 504. The apparatus 500 may further include one or more input/output interface(s) 506, and network interface(s) 508. The memory 504 is an example of computer readable media. The memory 504 may store therein a plurality of modules or units including a user behavior monitoring device 510, a detection device 520, and a changing device 530.

The user behavior monitoring device 510 acquires characteristic behavior data of a user.

Herein, the characteristic behavior data refers to behavior data that effectively represents resource use of a user. By taking use of resources of a cloud product service as an example, a CPU utilization rate, a memory utilization rate, a disk utilization rate, Query Per Second (QPS), the number of active connections, access delay and the like can be used as the characteristic behavior data. When the characteristic behavior data is acquired, behavior data of the user can be collected as much as possible, and then effective data is extracted as the characteristic behavior data. For example, all behavior data of the user may be acquired in real time by means of real-time monitoring, and then characteristic behavior data is extracted from all online behavior data of the user and buffered, for use in subsequent processing.

In an actual application, the type of the characteristic behavior data is kept relatively stable in a period of time, but may change with time, for example, in the first quarter, a behavior characteristic index of the user may include access delay, but in the second quarter, with upgrade of a network condition, it is possible that the data can no longer effectively represent the resource use of the user, and the access delay may be canceled from the characteristic behavior data.

The detection device 520 detects, at a detection triggering moment, whether characteristic behavior data of the user in a first time period matches a behavior pattern baseline, wherein the first time period is a time period of preset duration before the detection triggering moment.

Herein, the detection triggering moment refers to a moment for matching current characteristic behavior data of the user with a behavior pattern baseline, and may be generally set as a moment when a user behavior changes significantly and it is necessary to change a resource specification to adapt to the changed user behavior. For example, about 8:00 every day is a peak in usage of a cloud product; at this point, the characteristic behavior data such as a CPU utilization rate and a memory utilization rate may increase evidently, which may cause existing resources to be insufficient. Therefore, 8:00 may be set as the detection triggering moment.

Further, an advance may be pre-defined, such that the time for detection and changing the specification is a little earlier than an actual resource demand change. Still by taking the foregoing scenario as an example, an advance of 10 minutes may be set, and the detection triggering moment is set as 7:50.

The first time period is a time period of preset duration before the detection triggering moment, and during actual detection, the characteristic behavior data in the first time period is used as sample data for matching processing. The duration specifically set for the first time period may be determined according to an actual demand, for example, in this embodiment, it may be set as 15 minutes, that is, characteristic behavior data between 7:35 and 7:50 is used as a sample to be matched with a behavior pattern baseline.

The behavior pattern baseline may be obtained through offline calculation using characteristic behavior data accumulated in a period of time as a sample, and is used to indicate a use trend of the user with regard to a cloud product service resource in a certain cycle. By matching the characteristic behavior data obtained in real time with the behavior pattern baseline, it can be determined whether a current behavior of the user is in line with a predicted use trend, thereby achieving prediction on a resource use behavior of the user.

For example, in this example embodiment, the detection device 520, at a detection triggering moment, acquires behavior aggregate values of the user in the first time period according to the characteristic behavior data of the user in the first time period and preset weights, and if the behavior aggregate values of the user in the first time period are within a confidence interval of the behavior pattern baseline, determines that the characteristic behavior data of the user in the first time period matches the behavior pattern baseline.

For each type of characteristic behavior data, setting of a weight thereof mainly takes into account a degree of impact of the type of characteristic behavior data on the resource use behavior of the user. For example, for several types of characteristic behavior data mentioned in the above example, weights corresponding thereto may be set as follows: the CPU utilization rate (weight: 15%), the memory utilization rate (weight: 20%), the disk utilization rate (weight: 10%), the QPS (weight: 40%), the number of active connections (weight: 10%), and the access delay (weight: 5%).

By setting a confidence interval for the behavior pattern baseline, it is determined that the characteristic behavior data matches the behavior pattern baseline as long as behavior aggregate values of the user in the first time period are in the confidence interval of the behavior pattern baseline. FIG. 2(a) is a schematic diagram of a behavior pattern baseline of a user, and the part shown by 2A in the figure is a confidence interval; still by taking the above scenario as an example, in which the first time period is 15 minutes, assuming that a statistical granularity of the characteristic behavior data is set as "per minute", 15 corresponding behavior aggregate values are obtained through calculation accordingly, a distribution thereof is as shown by FIG. 2(b), and they are all in the confidence interval of the behavior pattern baseline. In order to improve the rationality of the matching result, a significance level $\alpha$ may be pre-defined, and as long as a ratio of behavior aggregate values not in the confidence interval of the behavior pattern baseline to all the behavior aggregate values is lower than $\alpha$, it is still determined that the characteristic behavior data of the user in the first time period matches the behavior pattern baseline.

The changing device 530 changes a resource specification of the user according to a resource demand baseline corresponding to the behavior pattern baseline when the characteristic behavior data of the user in the first time period matches the behavior pattern baseline.

The resource demand baseline is used to indicate a resource specification to be assigned to the user at a particular moment, for example, more resources need to be assigned in a peak, while fewer resources need to be assigned in a trough, thus achieving reasonable resource assignment. By taking a certain cloud product as an example, corresponding resources thereof may include, but not limited to, a storage space, a memory, the number of server instances, and so on. For each user, resource demand baselines thereof are one-to-one corresponding to behavior pattern baselines thereof. In an optimal condition, the resource demand baseline can ensure that the user is able to obtain a most reasonable resource specification at any moment in a behavior cycle when in line with the behavior pattern baseline. In an actual application, as excessively frequent changes of resource specification may affect normal business processing, the resource specification of the user may be changed only when the resource use behavior of the user changes significantly (generally at a preset detection triggering moment). Thus, the resource demand baseline is generally in the form of a broken line, as shown by FIG. 2(c).

By taking a memory resource as an example, the user requires a memory of 1000 MB in a peak but only requires 600 MB before the peak, and if it is determined, at a detection triggering moment corresponding to the peak, that a behavior of the user matches the behavior pattern baseline, the resource specification of the user may be changed to a memory of 1000 MB, to meet the user's resource use demand in the peak.

In addition, if the result of the matching detection is that the characteristic behavior data of the user in the first time period does not match the behavior pattern baseline, it indicates that the current resource use behavior of the user is not in line with a regular user behavior trend of the user in the cycle, and at this point, the resource specification is not changed, and matching detection is not performed again until a next detection triggering moment.

The technical solution of the present disclosure acquires characteristic behavior data of a user in real time, and at a detection triggering moment, matches the characteristic behavior data with a behavior pattern baseline obtained through offline calculation, thus predicting a peak or a trough of resource use. In this way, a resource specification to be used by the user is dynamically adjusted in advance according to a behavior pattern of the user, to meet a resource use demand of the user, and avoid that the user is in shortage of resources in the peak time or wastes resources in the trough time, thus achieving better predictability.

Herein, those skilled in the art should understand that the dynamic resource adjustment apparatus may include, but is not limited to, a user equipment, a network device, or a device formed by a user equipment and a network device through integration via a network. The user equipment includes, but is not limited to, a personal computer, a touch control terminal, and other implementations; the network device includes, but is not limited to, a network host, a single network server, and a set of multiple network servers or a set of cloud computing-based computers, and other implementations. Herein, the cloud is formed by a large number of hosts or network servers based on cloud computing, wherein cloud computing is one kind of distributed computing, which is a virtual computer formed by a set of loosely coupled computers.

Figure 6:
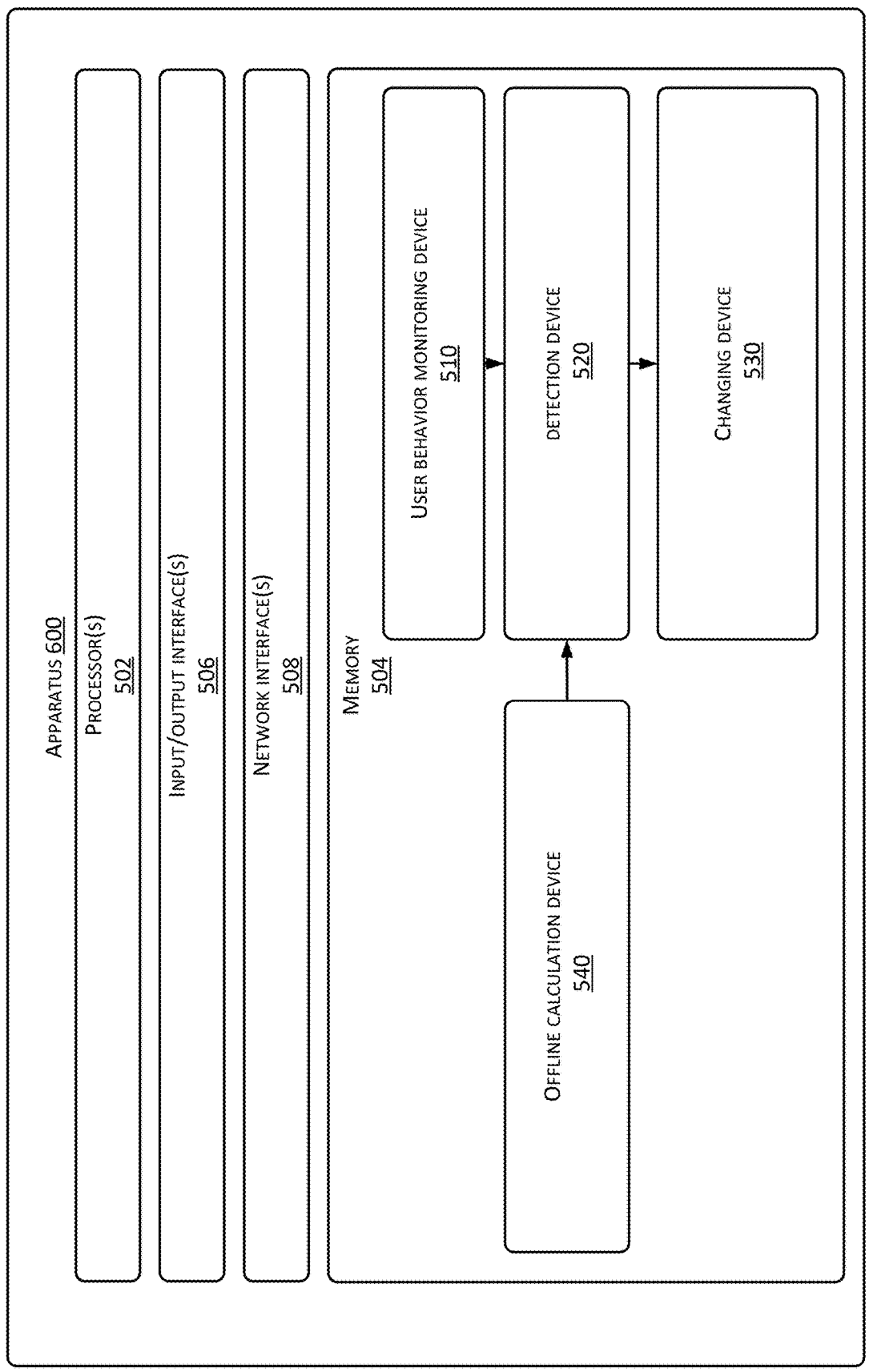
FIG. 6 is a schematic structural diagram of an example user behavior-based dynamic resource adjustment apparatus according to an example embodiment of the present disclosure.

The dynamic resource adjustment apparatus is mainly applied to online real-time processing, to achieve dynamic adjustment on a resource specification. In order to ensure that the online real-time processing part can be executed accurately, the dynamic resource adjustment apparatus further includes an offline processing part, to obtain a behavior pattern baseline and a resource demand baseline for matching and changing. Therefore, an example embodiment of the present disclosure further provides a user behavior-based dynamic resource adjustment apparatus 600, and the structure thereof is as shown in FIG. 6, which, in addition to the user behavior monitoring device 510, the detection device 520, and the changing device 530 shown in FIG. 5, the plurality of modules or units stored on memory 504 may further include an offline calculation device 540. The offline calculation device 540 generates a behavior pattern baseline of the user, and generates a corresponding resource demand baseline according to the behavior pattern baseline.

Figure 7:
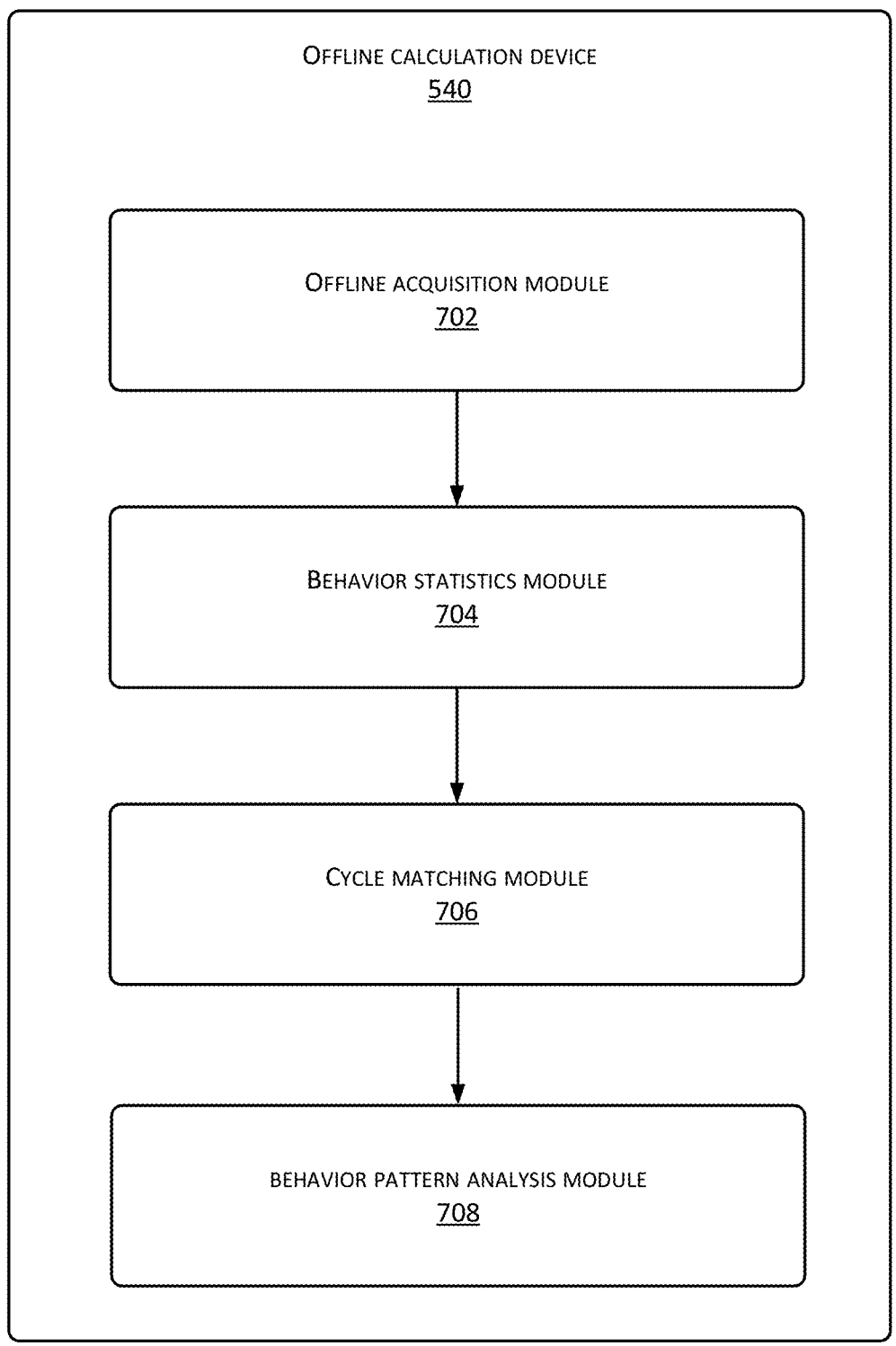
FIG. 7 is a schematic structural diagram of an offline calculation device in an example behavior-based dynamic resource adjustment apparatus.

For example, an example structure of the offline calculation device 540 is as shown in FIG. 7, which includes an offline acquisition module 702, a behavior statistics module 704, a cycle matching module 706, and a behavior pattern analysis module 708.

Wherein, the offline acquisition module 702 acquires characteristic behavior data of the user in a second time period. The second time period is a time period for collecting characteristic behavior data samples that generate the behavior pattern baseline. In an actual application, as a cycle type of a behavior pattern may be preliminarily determined according to actual experience, the duration of N cycles is used as the second time period. For example, if a behavior pattern of a user is based on a daily cycle, characteristic behavior data of the user in recent ten days may be acquired as a basis for generating a behavior pattern baseline. Certainly, in a situation where a preliminary judgment cannot be made according to actual experience, a longer time period may also be set as the second time period, to ensure that an accurate behavior pattern baseline can be obtained.

Similar to the online real-time processing part, when the characteristic behavior data of the user is acquired, behavior data of the user may also be collected as much as possible, and then effective data is extracted as the characteristic behavior data.

The behavior statistics module 704 acquires a behavior aggregate value of each moment in the second time period according to the characteristic behavior data and preset weights. Specifically, the behavior aggregate value of each moment may be calculated according to the following formula:

$$B_t = \sum_{i=1}^{n} A_i \times P_i$$

Wherein, the $B_t$ indicates a behavior aggregate value of a moment t, $A_i$ indicates characteristic behavior data of the moment t, and $P_i$ indicates a weight corresponding to $A_i$.

The cycle matching module 706 determines, according to the behavior aggregate value of each moment in the second time period, whether behavior aggregate values of the user in the second time period are periodic. As the behavior statistics module 704 obtains the behavior aggregate value of each moment in the second time period, aggregate data of time-behavior aggregate values is obtained. During cycle type matching, the aggregate data of time-behavior aggregate values may be matched with a preset set of several common cycle types, thus determining whether the behavior aggregate values are periodic and a specific cycle type.

In this example embodiment, in order to acquire the most precise cycle type, the behavior aggregate values of the user in the second time period may be matched with preset cycle types in ascending order of time granularities of the cycle types, and it is determined that the behavior aggregate values of the user in the second time period are periodic if they match any cycle type. For example, matching is sequentially performed in order of hourly, daily, and weekly, and when the aggregate data of time-behavior aggregate values can match a daily cycle type, it is unnecessary to continue matching with a weekly cycle type; it can be determined that the behavior aggregate values of the user in the second time period are periodic, and the cycle type is "daily".

For example, during cycle type matching, the cycle matching module 706 firstly divides the behavior aggregate values of the user in the second time period into multiple cycles according to a preset cycle type, and determines that the behavior aggregate values of the user in the second time period match the cycle type if a correlation coefficient of a fitted line of the behavior aggregate values in the multiple cycles exceeds a threshold.

In this example embodiment, assuming that the second time period is recent ten days, if matching is performed according to an hourly cycle type at first, behavior aggregate values in the ten days are divided on an hourly basis, and if a correlation coefficient of a fitted line of the behavior aggregate values in the multiple cycles is relatively low and does not exceed a preset threshold, it is determined that the behavior aggregate values of the user in the second time period do not match the hourly cycle type. Then, matching is continued according to a daily cycle type, and the behavior aggregate values in the ten days are divided on a daily basis; thus, the behavior aggregate values are divided into ten groups of behavior aggregate value data as sample data for calculation. If a calculated correlation coefficient of a fitted line of the ten groups of behavior aggregate value data exceeds the threshold, it can be determined that the behavior aggregate values of the user in the second time period match the hourly cycle type.

In an actual application, the correlation coefficient may be a Pearson correlation coefficient, the correlation coefficient is a value between [−1, 1], wherein 1 indicates that two values in comparison are positively correlated with each other, and −1 indicates that the two values are negatively correlated with each other, that is, when an absolute value of a similarity coefficient is closer to 1, it indicates that correlation between the two values is greater, otherwise, it indicates that the correlation between the two values is smaller. In this embodiment, generally, when the correlation coefficient is greater than 0.75, it may be considered that the correlation between the two values meets the requirement and the two values have similarity. For ten groups of sample data, according to a precision requirement, any number of combinations can be selected to determine the correlation, for example, four groups or five groups therein are extracted for pairwise calculation, and it is determined, according to calculated comparison results between multiple correlation coefficients and the threshold, whether the sample data matches the cycle type.

During determination of the correlation between any two groups of sample data, it is feasible to first generate a fitted line according to each group of sample data and then calculate a Pearson correlation coefficient between the fitted lines, thus making a determination. In addition, it is also feasible to generate a slope of each moment according to each group of sample data and then calculate their correlation according to slopes of corresponding moments.

In addition, if the behavior aggregate values of the user in the second time period do not match any cycle type after all preset cycle types are traversed, it is considered that the behavior aggregate values are not periodic. In the situation where the behavior aggregate values are not periodic, an empty behavior pattern baseline may be generated directly, and a corresponding resource demand baseline is not generated.

The behavior pattern analysis module 708 determines a behavior pattern baseline according to the behavior aggregate values of the user in the second time period when the behavior aggregate values of the user in the second time period are periodic.

In a specific processing procedure, the functions implemented by the behavior pattern analysis module 708 include:

1. Behavior aggregate values of several cycles are selected from the behavior aggregate values in the second time period. In a situation where a cycle type has been determined, behavior aggregate value data of several cycles is selected from all cycles in the second time period, for use in subsequent processing. In this process, the specific number of selected cycles may be selected arbitrarily according to a requirement on calculation precision, for example, in this embodiment, the second time period includes ten days in total (i.e., 10 cycles), and at this point, behavior aggregate values of any 5 days therein can be selected, for use in subsequent processing.

2. Behavior correction values of each moment in the several cycles are acquired according to behavior aggregate values of sliding windows under forgetting mechanism of each moment in the several cycles. Wherein, the sliding window under forgetting mechanism may be set to have a different window length according to factors such as a cycle type and a statistical granularity of behavior aggregate values, for example, in this embodiment, the cycle type is "daily" and the statistical granularity of behavior aggregate values is "per minute", and thus the sliding window under forgetting mechanism may be set as 10 minutes. That is, by taking the moment 8:00 as an example, a behavior correction value of 8:00 is calculated according to all behavior aggregate values between 7:55 and 8:05. When the behavior correction value is calculated, weights of behavior aggregate values of other moments in the sliding window under forgetting mechanism can be determined according to distances to a reference moment (8:00), for example, the closer the moment is to the reference moment, the greater the weight thereof is, and in this embodiment, weights of behavior aggregate values of various moments in the sliding window under forgetting mechanism are as shown in the following table:

| Moment | 7:55 | 7:56 | 7:57 | 7:58 | 7:59 | 8:00 | 8:01 | 8:02 | 8:03 | 8:04 | 8:05 |
|---|---|---|---|---|---|---|---|---|---|---|---|
| Weight | 3% | 5% | 7% | 10% | 15% | 40% | 15% | 10% | 7% | 5% | 3% |

Thus, a behavior correction value of a certain moment in all the selected cycles may be calculated according to the following formula:

$$C_t = \sum_{j=1}^{n} B_j \times P_j$$

$C_t$ indicates a behavior correction value of a moment t, $B_j$ indicates a behavior aggregate value of each moment in the sliding window under forgetting mechanism of the moment t, and $P_j$ indicates a weight corresponding to $B_j$.

3. A mean value of the behavior correction values of each moment in the several cycles is acquired as an aggregate correction value of the user at each moment in the cycles. In this embodiment, as the number of the cycles selected is 5, for a certain moment, 5 behavior correction values corresponding to respective cycles may be calculated respectively according to the foregoing formula, and an arithmetic mean thereof is an aggregate correction value of the user at this moment in the cycles; by traversing all moments in the cycles, an aggregate correction value of the user at each moment in the cycles can be obtained. A curve formed by the aggregate correction values is a behavior pattern baseline.

4. A confidence interval of the aggregate correction value of each moment in the cycles is acquired, and the behavior pattern baseline of the user is determined according to the confidence interval. In an actual application, the confidence interval thereof may be determined in the following manner: acquiring a mean value $\bar{X}$ and a variance $D(X)$ of the behavior correction values of each moment in the several cycles, using the sum of the mean value and the variance as an upper limit value of the confidence interval, and using a difference between the mean value and the variance as a lower limit value of the confidence interval, that is, $$\text{confidence interval} = [\bar{X} - D(X), \bar{X} + D(X)]$$

Thus, the behavior pattern baseline as shown in FIG. 2(*a*) is obtained. For the confidence interval, a significance level α may be further defined, such that a more reasonable result is obtained when user behavior matching is performed according to the behavior pattern baseline.

After the behavior pattern baseline is acquired, a time-varying resource demand baseline of the user can be obtained according to a mapping relationship between resource specifications and behavior patterns. As changing the resource specification too frequently may affect normal business processing, the resource specification of the user may be changed only when a resource use behavior of the user changes significantly. Thus, the resource demand baseline is generally in the form of a broken line, as shown in FIG. 2(*c*).

Figure 8:
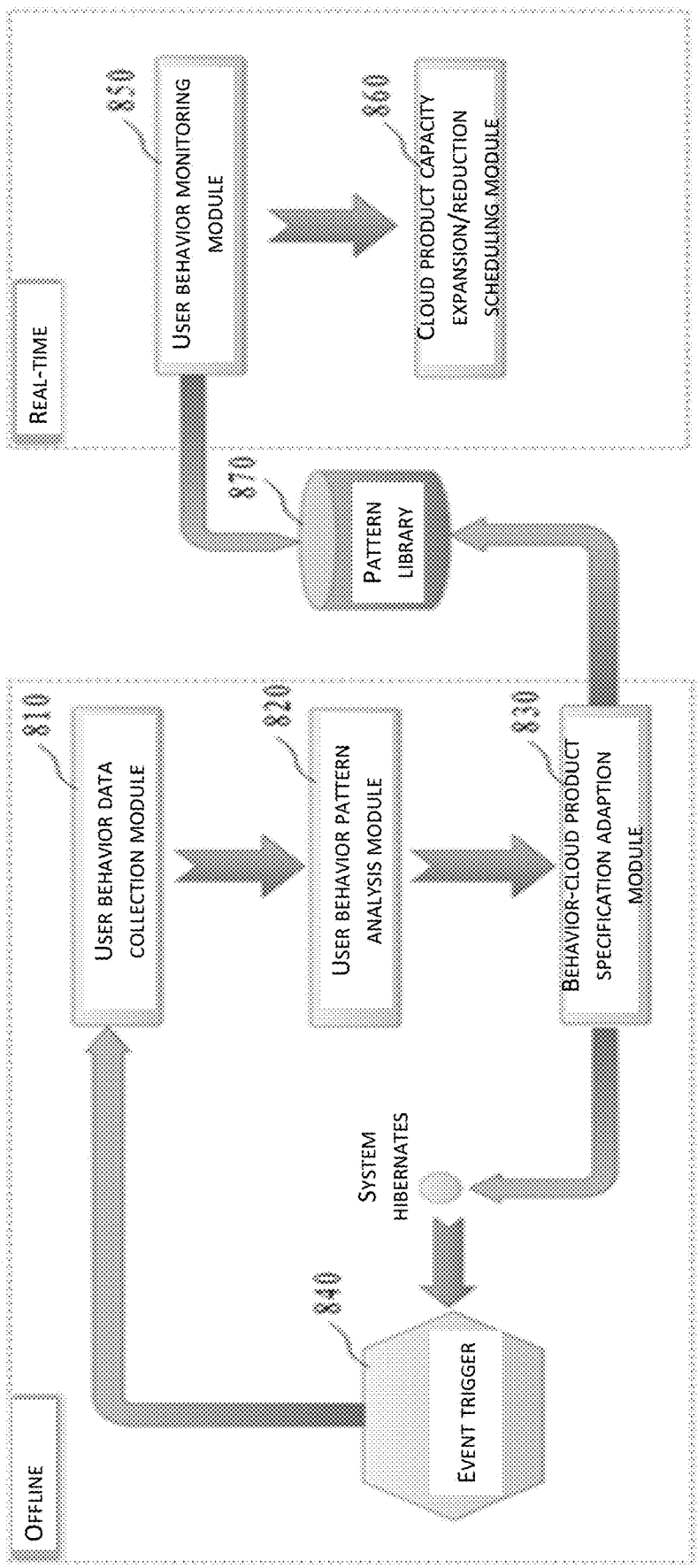
FIG. 8 is a schematic structural diagram of an example cloud product elastic upgrade and downgrade system implemented based on the technical solution of the present disclosure.

FIG. 8 illustrates a cloud product elastic upgrade and downgrade system implemented based on the technical solution of the present disclosure. The system includes an offline part and a real-time part, and includes a total of 5 functional modules, 1 trigger (event trigger), and 1 database (pattern library).

Wherein the offline part includes:

1. User behavior data collection module 810

It collects cloud product-based time-behavior data of a user, for example, CPU usage, memory usage, disk consumption, consumption of connections, the number of times that a database is accessed of a cloud product, and the like.

2. User behavior pattern analysis module 820

It extracts and analyzes characteristic behavior data of the user according to the time-behavior data, to obtain a time behavior pattern of the user, that is, a use trend (behavior pattern) with regard to the cloud product in a certain cycle.

3. Behavior-cloud product specification adaption module 830

It obtains, by means of aggregation and matching according to a time behavior pattern of the user, a cloud product specification (i.e., resource specification) corresponding to each time period in a cycle.

4. Event trigger 840

It awakens operation of an offline calculation task. The offline part is awakened from a sleeping state to an operating state, and the user behavior data collection module, the user behavior pattern analysis module, and the behavior-cloud product specification adaption module are started to perform corresponding processing, to obtain a behavior pattern of the user and a corresponding resource specification. Upon completion of the task, the offline part enters the sleeping state.

The real-time part includes:

1. User Behavior monitoring module 850

It monitors operating behavior of the user on a cloud product in real time, matches the operating behavior with a behavior pattern of the user, and triggers a cloud product capacity expansion/reduction scheduling module when the current operating behavior of the user is in line with the behavior pattern and a resource specification corresponding to the behavior pattern is to be changed.

2. Cloud product capacity expansion/reduction scheduling module 860

It expands or reduces the capacity of specification of the cloud product of the user according to the resource specification to be changed.

3. Pattern library 870

It stores the behavior pattern of the user calculated by the offline part and the cloud product specification correspondingly matched, for the real-time part to carry out monitoring and verification.

In summary, the technical solution of the present disclosure acquires characteristic behavior data of a user in real time, and at a detection triggering moment, matches the characteristic behavior data with a behavior pattern baseline obtained through offline calculation, thus predicting a peak or a trough of resource use. In this way, a resource specification to be used by the user is dynamically adjusted in advance according to a behavior pattern of the user, to meet a resource use demand of the user, and avoid that the user is in shortage of resources in the peak time or wastes resources in trough time, thus achieving better predictability.

It should be noted that the present disclosure may be implemented in software, hardware, and/or a combination of software and hardware, for example, an application specific integrated circuit (ASIC), a general-purpose computer or any other similar hardware devices can be used for implementing the present disclosure. In one embodiment, a software program of the present disclosure may be executed by a processor to achieve the steps or functions described above. Similarly, the software program (including a related data structure) of the present disclosure can be stored into a computer readable recording medium, for example, a RAM memory, a magnetic or optical drive or a floppy disk and similar devices. In addition, some steps or functions of the present disclosure may be implemented with hardware, for example, a circuit that performs various steps or functions in cooperation with the processor.

In addition, a part of the present disclosure may be applied as a computer program product, for example, a computer program instruction, and when it is executed by a computer, the method and/or the technical solution according to the present disclosure is called or provided through operations of the computer. The program instructions or computer-executable instructions that call the method of the present disclosure may be stored in a fixed or removable recording medium, and/or transmitted by means of broadcast or data streams in other signal bearer media, and/or stored in a working memory of a computer device that runs according to the program instruction. Herein, an example embodiment according to the present disclosure includes an apparatus, the apparatus including one or more memories configured to store computer-executable instructions and one or more processors configured to execute the computer-executable instructions, wherein, when the computer-executable instructions are executed by the processors, the apparatus is triggered to run the method and/or the technical solution based on the multiple embodiments of the present disclosure.

For those skilled in the art, it is apparent that the present disclosure is not limited to the details of the foregoing example embodiments, and the present disclosure may be implemented in other specific forms without departing from the spirit or basic features of the present disclosure. Therefore, from whichever perspective, the embodiments are regarded as exemplary instead of being restrictive, the scope of the present disclosure is defined by the appended claims instead of the above description, and thus the present disclosure is intended to cover all changes falling in the meaning and scope of the equivalent elements. None of the reference signs in the claims should be regarded as limiting the involved claims. In addition, it is apparent that the wording "include" does not exclude other units or steps, and the singular form does not exclude the plural form. Multiple units or apparatus stated in the apparatus claims may also be implemented by one unit or apparatus through software or hardware. Terms such as "first" and "second" are used to represent names, but do not indicate any specific order.

What is claimed is:

1. A method comprising:
acquiring characteristic resource capacity usage data of a user, the characteristic resource capacity usage data representing computing resource capacity usage by the user;
detecting, at a detection triggering moment, whether characteristic resource capacity usage data of the user in a first time period matches a behavior pattern baseline, the first time period being a time period of preset duration before the detection triggering moment; and
changing, at the detection triggering moment, a resource capacity allocation assigned to the user during at least before the detection triggering moment according to a resource demand baseline corresponding to the behavior pattern baseline in response to determining that the characteristic resource capacity usage data of the user in the first time period matches the behavior pattern baseline.

2. The method of claim 1, wherein the detecting whether the characteristic resource capacity usage data of the user in the first time period matches the behavior pattern baseline includes:
acquiring behavior aggregate values of the user in the first time period according to the characteristic resource capacity usage data of the user in the first time period and preset weights; and
determining that the characteristic resource capacity usage data of the user in the first time period matches the behavior pattern baseline in response to determining that the behavior aggregate values of the user in the first time period are within a confidence interval of the behavior pattern baseline.

3. The method of claim 1, further comprising:
generating the behavior pattern baseline of the user; and
generating the resource demand baseline according to the behavior pattern baseline.

4. The method of claim 3, wherein the generating the behavior pattern baseline of the user includes:
acquiring characteristic resource capacity usage data of the user in a second time period, the second time period being a time period for collecting characteristic resource capacity usage data samples that generate the behavior pattern baseline;
acquiring a behavior aggregate value of each moment in the second time period according to the characteristic resource capacity usage data of the user in the second time period and a preset weight;
determining, according to the behavior aggregate value of each moment in the second time period, whether behavior aggregate values of the user in the second time period are periodic; and
determining the behavior pattern baseline according to the behavior aggregate values of the user in the second time period in response to determining that the behavior aggregate values of the user in the second time period are periodic.

5. The method of claim 4, wherein the determining, according to the behavior aggregate value of each moment in the second time period, whether behavior aggregate values of the user in the second time period are periodic includes:
matching the behavior aggregate values of the user in the second time period with preset cycle types in ascending order of time granularities of the preset cycle types; and
determining that the behavior aggregate values of the user in the second time period are periodic in response to determining that the behavior aggregate values of the user in the second time period match at least a respective preset cycle type.

6. The method of claim 5, wherein the matching the behavior aggregate values of the user in the second time period with preset cycle types includes:
dividing the behavior aggregate values of the user in the second time period into multiple cycles according to the respective preset cycle type; and
determining that the behavior aggregate values of the user in the second time period match the respective preset cycle type in response to determining that a correlation coefficient of a fitted line of behavior aggregate values in the multiple cycles exceeds a threshold.

7. The method of claim 4, wherein the determining the behavior pattern baseline according to the behavior aggregate values of the user in the second time period includes:
selecting, from the behavior aggregate values in the second time period, behavior aggregate values of a plurality of cycles;
acquiring behavior correction values of each moment in the plurality of cycles according to behavior aggregate values of sliding windows under forgetting mechanism of each moment in the plurality of cycles;
acquiring a mean value of the behavior correction values of each moment in the plurality of cycles as an aggregate correction value of the user at each moment in the plurality of cycles;
acquiring a confidence interval of the aggregate correction values of each moment in the plurality of cycles; and
determining the behavior pattern baseline of the user according to the confidence interval of the aggregate correction values of each moment in the plurality of cycles.

8. The method of claim 7, wherein the acquiring the confidence interval of the aggregate correction values of each moment in the cycles includes:
acquiring a mean value and a variance of the behavior correction values of each moment in the plurality of cycles;

using a sum of the mean value and the variance as an upper limit value of the confidence interval; and using a difference between the mean value and the variance as a lower limit value of the confidence interval.

9. An apparatus, comprising:
one or more processors;
memory;
a user behavior monitoring device stored in the memory and executable by the one or more processors configured to cause the one or more processors to acquire characteristic resource capacity usage data of a user, the characteristic behavior data representing computing resource capacity usage by the user;
a detection device stored in the memory and executable by the one or more processors configured to cause the one or more processors to detect, at a detection triggering moment, whether characteristic resource capacity usage data of the user in a first time period matches a behavior pattern baseline, the first time period being a time period of preset duration before the detection triggering moment; and
a changing device stored in the memory and executable by the one or more processors configured to cause the one or more processors to change, at the detection triggering moment, a resource capacity allocation assigned to the user during at least before the detection triggering moment according to a resource demand baseline corresponding to the behavior pattern baseline when the characteristic resource capacity usage data of the user in the first time period matches the behavior pattern baseline.

10. The apparatus of claim 9, wherein the detection device is further configured to cause the one or more processors to detect, at the detection triggering moment, behavior aggregate values of the user in the first time period according to the characteristic resource capacity usage data of the user in the first time period and preset weights, and determine that the characteristic resource capacity usage data of the user in the first time period matches the behavior pattern baseline in response to determining that the behavior aggregate values of the user in the first time period are within a confidence interval of the behavior pattern baseline.

11. The apparatus of claim 9, further comprising:
an offline calculation device stored in the memory and executable by the one or more processors configured to cause the one or more processors to generate a behavior pattern baseline of the user, and generate a corresponding resource demand baseline according to the behavior pattern baseline.

12. The apparatus of claim 11, wherein the offline calculation device includes:
an offline acquisition module stored in the memory and executable by the one or more processors configured to cause the one or more processors to acquire characteristic resource capacity usage data of the user in a second time period, the second time period being a time period for collecting characteristic resource capacity usage data samples that generate the behavior pattern baseline;
a behavior statistics module stored in the memory and executable by the one or more processors configured to cause the one or more processors to acquire a behavior aggregate value of each moment in the second time period according to the characteristic resource capacity usage data and a preset weight;
a cycle matching module stored in the memory and executable by the one or more processors configured to cause the one or more processors to determine, according to the behavior aggregate value of each moment in the second time period, whether behavior aggregate values of the user in the second time period are periodic; and
a behavior pattern analysis module stored in the memory and executable by the one or more processors configured to cause the one or more processors to determine the behavior pattern baseline according to the behavior aggregate values of the user in the second time period when the behavior aggregate values of the user in the second time period are periodic.

13. The apparatus of claim 12, wherein the cycle matching module is further executable by the one or more processors configured to cause the one or more processors to match the behavior aggregate values of the user in the second time period with preset cycle types in ascending order of time granularities of the preset cycle types, and determine that the behavior aggregate values of the user in the second time period are periodic in response to determining that the behavior aggregate values of the user in the second time period match at least a respective preset cycle type.

14. The apparatus of claim 13, wherein the cycle matching module is further executable by the one or more processors configured to cause the one or more processors to, when matching the behavior aggregate values of the user in the second time period with preset cycle types, divide the behavior aggregate values of the user in the second time period into multiple cycles according to the respective preset cycle type, and determine that the behavior aggregate values of the user in the second time period match the respective preset cycle type in response to determining that a correlation coefficient of a fitted line of behavior aggregate values in the multiple cycles exceeds a threshold.

15. The apparatus of claim 12, wherein the behavior pattern analysis module is further configured to cause the one or more processors to:
select, from the behavior aggregate values in the second time period, behavior aggregate values of a plurality of cycles in response to determining that the behavior aggregate values of the user in the second time period are periodic;
acquire behavior correction values of each moment in the plurality of cycles according to behavior aggregate values of sliding windows under forgetting mechanism of each moment in the plurality of cycles;
acquire a mean value of the behavior correction values of each moment in the plurality of cycles as an aggregate correction value of the user at each moment in the cycles;
acquire a confidence interval of the aggregate correction values of each moment in the plurality of cycles, and determine the behavior pattern baseline of the user according to the confidence interval.

16. The apparatus of claim 15, wherein the behavior pattern analysis module is further configured to cause the one or more processors to:
when acquiring the confidence interval of the aggregate correction values of each moment in the plurality of cycles, acquire a mean value and a variance of the behavior correction values of each moment in the plurality of cycles;
use the sum of the mean value and the variance as an upper limit value of the confidence interval; and
use a difference between the mean value and the variance as a lower limit value of the confidence interval.

17. One or more memories stored thereon computer-executable instructions that, when executed by one or more processors, cause the processor to perform acts comprising:

acquiring characteristic resource capacity usage data of a user, the characteristic behavior data representing computing resource capacity usage by the user;

detecting, at a detection triggering moment, whether characteristic resource capacity usage data of the user in a first time period matches a behavior pattern baseline, the first time period being a time period of preset duration before the detection triggering moment; and changing, at the detection triggering moment, a resource capacity allocation assigned to the user during at least before the detection triggering moment according to a resource demand baseline corresponding to the behavior pattern baseline in response to determining that the characteristic resource capacity usage data of the user in the first time period matches the behavior pattern baseline.

18. The one or more memories of claim 17, wherein the detecting whether the characteristic resource capacity usage data of the user in the first time period matches the behavior pattern baseline includes:

acquiring behavior aggregate values of the user in the first time period according to the characteristic resource capacity usage data of the user in the first time period and preset weights; and determining that the characteristic resource capacity usage data of the user in the first time period matches the behavior pattern baseline in response to determining that the behavior aggregate values of the user in the first time period are within a confidence interval of the behavior pattern baseline.

19. The one or more memories of claim 17, wherein the acts further comprise:

generating the behavior pattern baseline of the user; and generating the resource demand baseline according to the behavior pattern baseline.

20. The one or more memories of claim 18, wherein the generating the behavior pattern baseline of the user includes:

acquiring characteristic resource capacity usage data of the user in a second time period, the second time period being a time period for collecting characteristic resource capacity usage data samples that generate the behavior pattern baseline;

acquiring a behavior aggregate value of each moment in the second time period according to the characteristic resource capacity usage data of the user in the second time period and a preset weight;

determining, according to the behavior aggregate value of each moment in the second time period, whether behavior aggregate values of the user in the second time period are periodic; and determining the behavior pattern baseline according to the behavior aggregate values of the user in the second time period in response to determining that the behavior aggregate values of the user in the second time period are periodic.

\* \* \* \* \*